(12) United States Patent
Carpenter et al.

(10) Patent No.: US 9,940,696 B2
(45) Date of Patent: Apr. 10, 2018

(54) DYNAMIC IMAGE ADJUSTMENT TO ENHANCE OFF- AXIS VIEWING IN A DISPLAY ASSEMBLY

(71) Applicant: GM GLOBAL TECHNOLOGY OPERATIONS LLC, Detroit, MI (US)

(72) Inventors: James A. Carpenter, Rochester Hills, MI (US); Thomas A. Seder, Warren, MI (US); William E. Conway, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 96 days.

(21) Appl. No.: 15/080,056

(22) Filed: Mar. 24, 2016

(65) Prior Publication Data

US 2017/0278218 A1 Sep. 28, 2017

(51) Int. Cl.
*G06T 3/60* (2006.01)
*G06T 3/20* (2006.01)
*G06F 3/01* (2006.01)

(52) U.S. Cl.
CPC ............... *G06T 3/60* (2013.01); *G06F 3/013* (2013.01); *G06T 3/20* (2013.01)

(58) Field of Classification Search
None
See application file for complete search history.

(56) References Cited

U.S. PATENT DOCUMENTS

| | | | | |
|---|---|---|---|---|
| 4,177,579 A * | 12/1979 | Peters | ................... | G09B 9/302 348/123 |
| 5,465,121 A * | 11/1995 | Blalock | ................ | H04N 3/2335 348/181 |
| 8,508,548 B2 * | 8/2013 | Brown Elliott | ...... | G09G 3/2003 345/613 |
| 8,922,480 B1 * | 12/2014 | Freed | ....................... | G09G 5/00 345/156 |
| 9,241,155 B2 * | 1/2016 | Stamate | ............. | H04N 13/0278 |
| 9,317,627 B2 * | 4/2016 | Gielis | ................... | G06T 11/203 |
| 9,466,237 B2 * | 10/2016 | Kim | ...................... | G09G 3/2044 |
| 2005/0057482 A1 * | 3/2005 | Youngblood | ........ | G09G 3/3688 345/100 |
| 2005/0276088 A1 * | 12/2005 | Moon | ................... | G09G 3/3648 365/63 |

(Continued)

*Primary Examiner* — Michelle M Hausmann
(74) *Attorney, Agent, or Firm* — Quinn IP Law

(57) ABSTRACT

A display assembly includes a display console displaying at least one image on an image plane. The image is divided into a plurality of pixels. A controller is operatively connected to the display console and includes a processor and tangible, non-transitory memory on which is recorded instructions for executing a method for dynamically adjusting the image in real-time for off-axis viewing. The controller is programmed to generate a compensation-over-viewing-angle map which includes respective compensation factors for each of the plurality of pixels for multiple viewing positions. In one embodiment, the controller is programmed to apply separate respective compensation factors for the instantaneous viewing positions of a first user at a time j and a second user at a time k. In another embodiment, the controller is programmed to apply first and second compensation factors simultaneously at a time m, for a first image and a second image, respectively.

15 Claims, 4 Drawing Sheets

(56) References Cited

U.S. PATENT DOCUMENTS

| | | | |
|---|---|---|---|
| 2009/0116108 A1* | 5/2009 | Levecq | G02B 27/2214 |
| | | | 359/463 |
| 2013/0044124 A1* | 2/2013 | Reichert, Jr. | G06T 3/00 |
| | | | 345/618 |
| 2014/0285418 A1* | 9/2014 | Adachi | G06F 3/013 |
| | | | 345/156 |
| 2015/0177906 A1* | 6/2015 | Yairi | G06T 3/0006 |
| | | | 345/648 |

* cited by examiner

DYNAMIC IMAGE ADJUSTMENT TO ENHANCE OFF- AXIS VIEWING IN A DISPLAY ASSEMBLY

TECHNICAL FIELD

The disclosure relates generally to a display assembly, and more particularly, to dynamic image adjustment to enhance off-axis viewing in a display assembly.

BACKGROUND

Many devices include various forms of displays, such as liquid crystal displays. When an image on the display is viewed by a user at a significant off-axis angle, certain characteristics of the image are altered and the image appears differently.

SUMMARY

A display assembly includes a display console displaying at least one image on an image plane. The image is divided into a plurality of pixels. A controller is operatively connected to the display console. The controller includes a processor and tangible, non-transitory memory on which is recorded instructions for executing a method for dynamically adjusting the image in real-time for off-axis viewing. Execution of the instructions by the processor causes the controller to generate a compensation-over-viewing-angle map, which includes respective compensation factors for each of the plurality of pixels for multiple viewing positions.

The controller may be programmed to obtain a first instantaneous viewing position of a first user at a time j. A respective compensation factor (from the compensation-over-viewing-angle map) may be applied to each of the plurality of pixels at the time j, for the first instantaneous viewing position. The controller may be programmed to obtain a second instantaneous viewing position of a second user at a time k. A respective compensation factor (from the compensation-over-viewing-angle map) may be applied to each of the plurality of pixels at the time k, for the second instantaneous viewing position.

The image plane may define a coordinate system with an origin, an x-axis, a y-axis and a z-axis, the x-axis and the y-axis defining an x-y plane. The first instantaneous viewing position may be based at least partially on a viewing reference vector (R) between the origin and an eye reference point of the first user, a first angle ($\theta$) and a second angle ($\varphi$). The first angle ($\theta$) is between the x-axis and an x-y projection vector ($r_{xy}$), the x-y projection vector ($r_{xy}$) being a projection of the viewing reference vector (R) on the x-y plane. The second angle ($\varphi$) is between a normal vector perpendicular to the display console and the viewing reference vector (R).

A camera may be operatively connected to the controller and configured to obtain a first eye reference point of the first user in real-time. The viewing reference vector (R), the first angle ($\theta$) and the second angle ($\varphi$) may be dynamically adjusted based at least partially on the first eye reference point in real-time.

The display console may be rotated a tilt angle ($\alpha$) about a rotation axis such that an original position ($x_1$, $y_1$) on the image is rotated to a modified position ($x_2$, $y_2$) relative to the origin. A y-coordinate ($y_2$) of the modified position ($x_2$, $y_2$) is a function of the original position ($x_1$, $y_1$) and the tilt angle ($\alpha$), such that $y_2=(y_1 * \text{cosine}(\alpha))$. The controller may be programmed to obtain a modified first angle ($\theta_2$) and a modified second angle ($\varphi_2$) to compensate for the tilt angle ($\alpha$). The modified first angle ($\theta_2$) is based at least partially on a modified projection ($r_{xy,2}$) and a radial distance (r) between the origin and the eye reference point of the first user, the modified first angle ($\theta_2$) being defined as $[90-(\text{cosine}^{-1}(r_{xy,2}/r))]$. The modified second angle ($y_2$) is based at least partially on a modified projection ($r_{xy,2}$) and a modified y coordinate ($y_2$), the modified second angle ($\varphi_2$) being defined as $[180-(\text{sine}^{-1}(y_2/(r_{xy,2})))]$. The modified projection ($r_{xy,2}$) is a function of the original position ($x_1$, $y_1$) and the tilt angle ($\alpha$), such that $r_{xy,2}=(x_2+y_2)^{0.5}$.

In a second embodiment, the display console may include a first set of pixels configured to support presentation of a first image visible from a first side of the display console. The display console includes a second set of pixels configured to support presentation of a second image visible from a second side of the display console. A barrier structure may be positioned adjacent to the display console. The barrier structure separates the first and second images such the first image is not visible from the second side and the second image is not visible from the first side. The barrier structure keeps the first and the second light beams emanating from the first and second images from interfering. A first user may be positioned at the first side and a second user may be positioned at the second side.

The controller may be programmed to obtain respective instantaneous viewing positions of the first and second users, at a time m. The controller may be programmed to apply a first and a second compensation factor simultaneously, at a time m, to the first and second images, respectively, based at least partially on the compensation-over-viewing-angle map. The first compensation factor is applied to the first set of pixels of the first image for the first instantaneous viewing position of the first user at the time m and second compensation factor is applied to the second set of pixels of the second image for the second instantaneous viewing position of the second user at the time m.

The image may be characterized by gray scale levels and the respective compensation factors may adjust respective luminance steps of the gray scale levels in real-time. Each of the plurality of pixels may be characterized by a respective original gamma factor ($\gamma_o$) and a respective voltage ($V_o$). The controller may be programmed to employ a predefined desired gamma constant ($\gamma_d$) to determine a respective desired luminance ($L_d$) at the respective original voltage ($V_o$), for each of the plurality of pixels. A respective shifted voltage ($V_s$) is determined that results in the respective desired luminance ($L_d$) at the original gamma factor ($\gamma_o$), for each of the plurality of pixels. The compensation may include changing the respective voltage applied to each of the plurality of pixels from the original voltage ($V_o$) to the shifted voltage ($V_s$).

Each of the plurality of pixels may be characterized by a respective original gamma factor ($\gamma_o$) and a respective original gray scale value ($G_o$). The controller may be programmed to employ a predefined desired gamma constant ($\gamma_d$) to determine a respective desired luminance ($L_d$) at the respective original gray scale value ($G_o$), for each of the plurality of pixels. A respective shifted gray scale value ($G_s$) is determined that results in the desired luminance ($L_d$) at the respective original gamma factor ($\gamma_o$), for each of the plurality of pixels. The compensation may include changing the respective original gray scale value ($G_o$) for each of the plurality of pixels to the respective shifted gray scale value ($G_s$).

The above features and advantages and other features and advantages of the present invention are readily apparent

DETAILED DESCRIPTION

Figure 1:
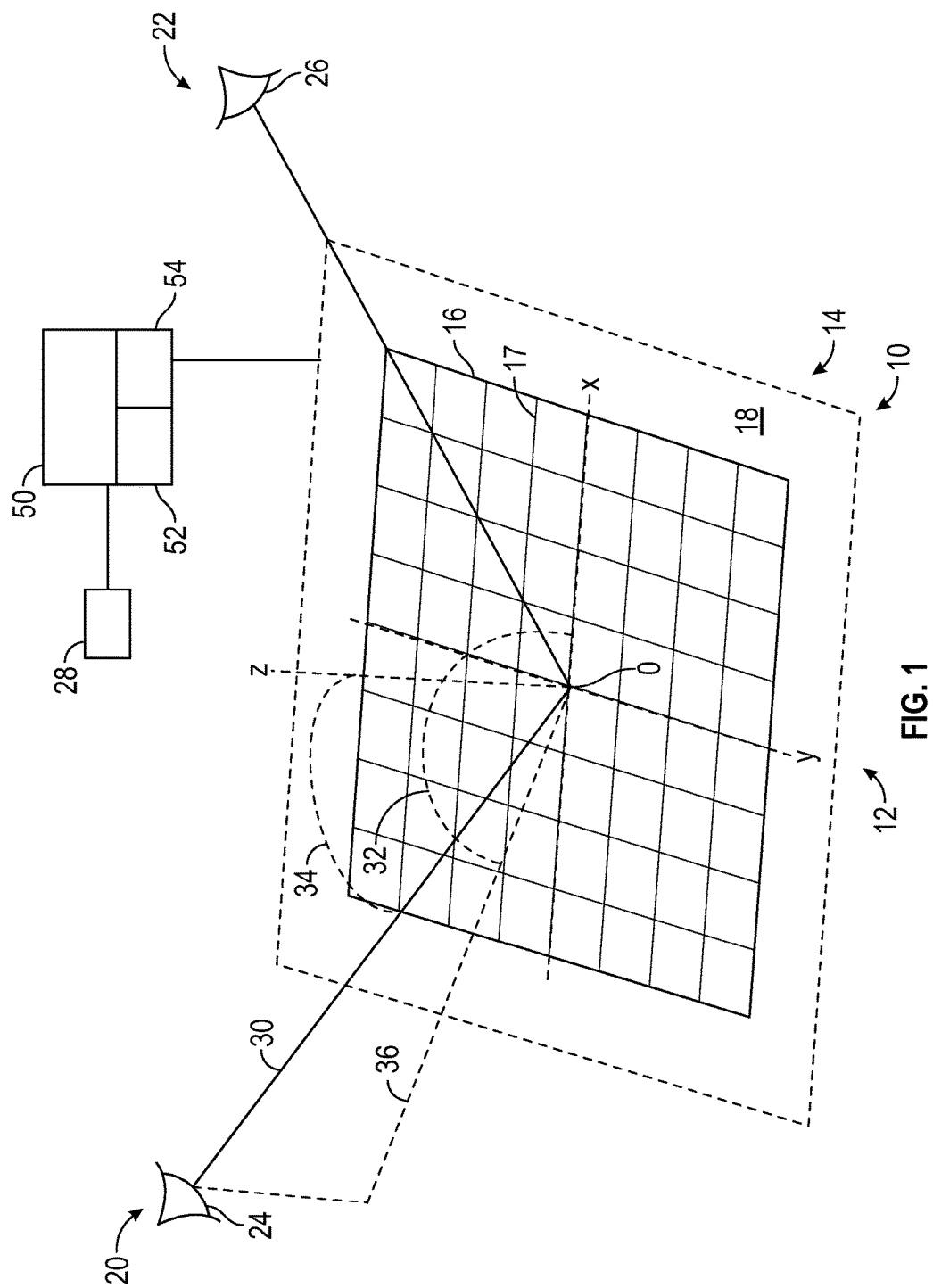
FIG. 1 is a schematic fragmentary view of a display assembly having a controller, in accordance with a first embodiment of the disclosure.
Figure 2:
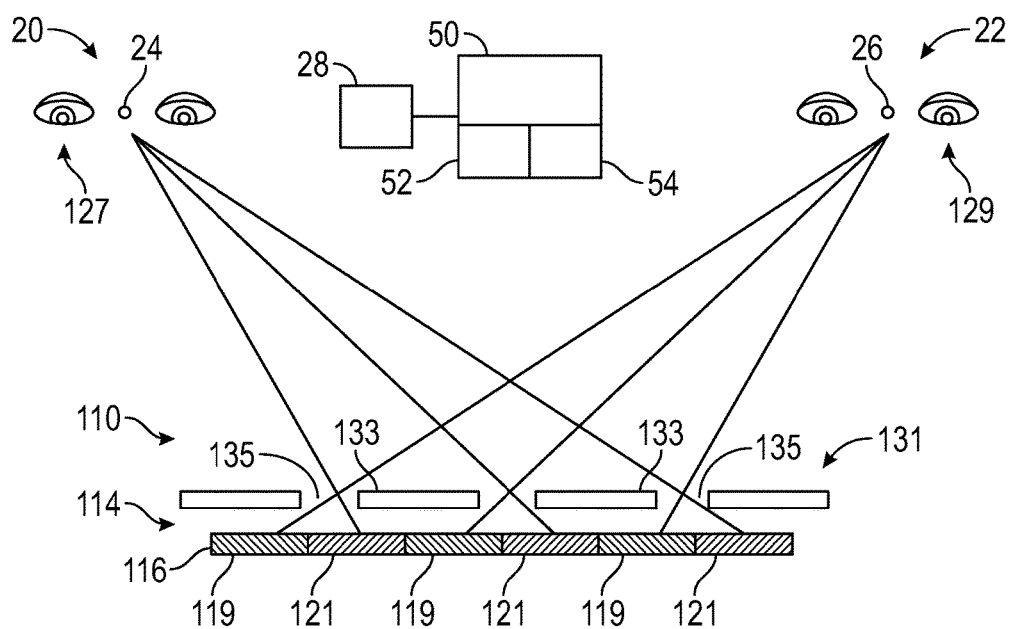
FIG. 2 is a schematic fragmentary view of another display assembly having the controller, in accordance with a second embodiment of the disclosure.
Figure 3:
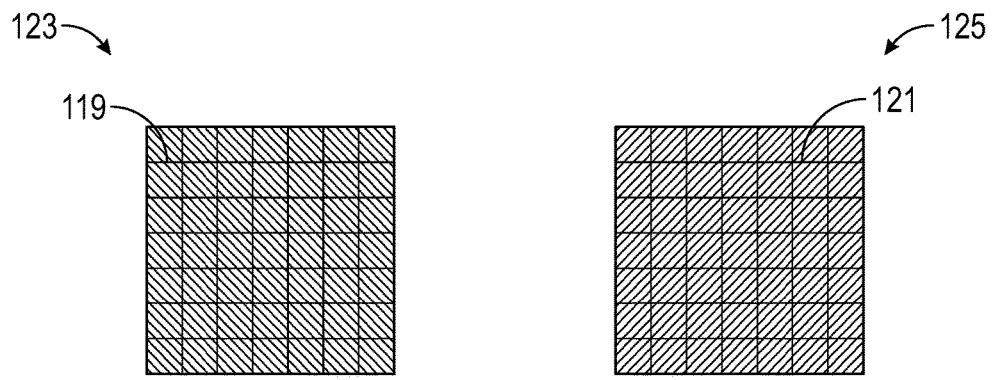
FIG. 3 is a schematic view of the first and second images produced by the display assembly of FIG. 2.

Referring to the drawings, wherein like reference numbers refer to like components, FIGS. 1-3 schematically illustrates a display assembly 10. Referring to FIG. 1, the display assembly may be part of a device 12. The device 12 may be a mobile platform, such as, but not limited to, standard passenger car, sport utility vehicle, light truck, heavy duty vehicle, ATV, minivan, bus, transit vehicle, bicycle, robot, farm implement, sports-related equipment, boat, plane, train or any other transportation device. The device 12 may take many different forms and include multiple and/or alternate components and facilities.

Referring to FIG. 1, the assembly 10 includes a display console 14 displaying at least one image 16 on an image plane 18. The display console 14 may be a liquid crystal display or any other display technology known to those skilled in the art. The image 16 is divided into a plurality of pixels 17. Referring to FIG. 1, the display console 14 may be visible to a plurality of users, including a first user 20 and a second user 22. In one embodiment, the first user 20 may be a driver of the device 12 and the second user 22 may be a passenger of the device 12. The first and second users 20, 22 define first and second eye reference points 24 and 26. The first and second eye reference points 24, 26 may be taken to be the center of the respective pair of eyes of each user or may be defined in any other suitable manner. While two users are described herein, it is to be understood that the display console 14 may be visible to an unlimited number of users.

Referring to FIGS. 2-3, a second embodiment is shown of a display assembly 110. The display assembly 110 includes a display console 114 having a first set of pixels 119 configured to support presentation of a first image 123 (shown in FIG. 3) visible from a first side 127 of the display console 114. The display console 114 includes a second set of pixels 121 configured to support presentation of a second image 125 (shown in FIG. 3) visible from a second side 129 of the display console 114. The first image 123 and the second image 125 are displayed on an image plane 116 9 see FIG. 2). The first user 20 may be positioned at the first side 127 and the second user 22 may be positioned at the second side 129. Referring to FIG. 2, a barrier structure 131 may be positioned adjacent to the display console 114. The barrier structure 131 separates the first and second images 123, 125 (i.e. prevents interference) such the first image 123 is not visible from the second side 129 and the second image 121 is not visible from the first side 127. The barrier structure 131 may include multiple light-blocking devices 133 separated by gaps 135.

Referring to FIGS. 1-2, a controller 50 is operatively connected to the display console 14. The controller 50 includes at least one processor 52 and at least one memory 54 (or any non-transitory, tangible computer readable storage medium) on which are recorded instructions for executing method 200, shown in FIG. 4, for dynamically adjusting the at least one image (such as, for example, image 16 of the first embodiment and images 123 and 125 of the second embodiment) in real-time for off-axis viewing. The memory 54 can store controller-executable instruction sets, and the processor 52 can execute the controller-executable instruction sets stored in the memory 54. The controller 50 of FIGS. 1-2 is specifically programmed to execute the steps of the method 200 (as discussed in detail below with respect to FIG. 4).

Referring to FIGS. 1-2, a camera 28 may be operatively connected to the controller 50 and configured to track the first and second eye reference points 24, 26 of the first and second users 20, 22, respectively, in real-time. The viewing reference vector 30 (R), the first angle 32 ($\theta$) and the second angle 34 ($\varphi$) (shown in FIG. 1) may be dynamically adjusted based at least partially on the first and second eye reference points 24, 26 in real-time. Seat position sensors (not shown) may also be employed to estimate the first and second eye reference points 24, 26 based on the respective seat positions of the first and second users 20, 22, respectively.

Referring to FIG. 1, the display console 14 (or the display console 114 of FIG. 2) may define a coordinate system with an origin (O), an x-axis (X), a y-axis (Y) and a z-axis (Z). The x-axis (X) and the y-axis (Y) define an x-y plane. The instantaneous viewing position may be based at least partially on a viewing reference vector 30 (R) between the origin (O) and the first eye reference point 24 (or second eye reference point 26), a first angle 32 ($\theta$) and a second angle 34 ($\varphi$). The first angle 32 ($\theta$) is between the x-axis and an x-y projection vector 36 ($r_{xy}$), the x-y projection vector 36 ($r_{xy}$) being a projection of the viewing reference vector 30 (R) on the x-y plane. Referring to FIG. 1, the second angle 34 ($\varphi$) is between a normal vector (the z-axis in FIG. 5) perpendicular to the display console and the viewing reference vector 30 (R).

Figure 5:
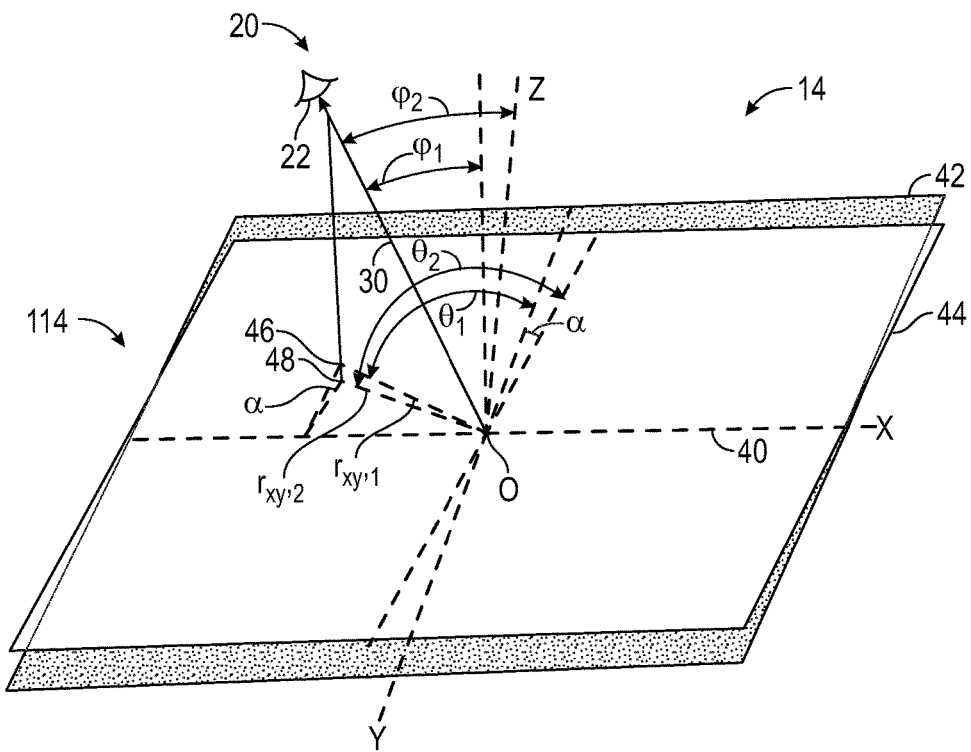
FIG. 5 is a schematic perspective fragmentary view of the display assemblies of FIGS. 1 and 2 in a rotated and un-rotated position.

Referring to FIG. 5, the display console 14 (or display console 114) may be rotated may be rotated a tilt angle ($\alpha$) about a rotation axis 40. Referring to FIG. 5, the un-rotated position 42 and the rotated position 44 of the display console 14 (or display console 114) are shown. Referring to FIG. 5, the display consoles 14, 114 may be rotated may be rotated a tilt angle ($\alpha$) such that an original position 46 ($x_1$, $y_1$) on the image plane is rotated to a modified position 48 ($x_2$, $y_2$) relative to the origin (O).

Figure 4:
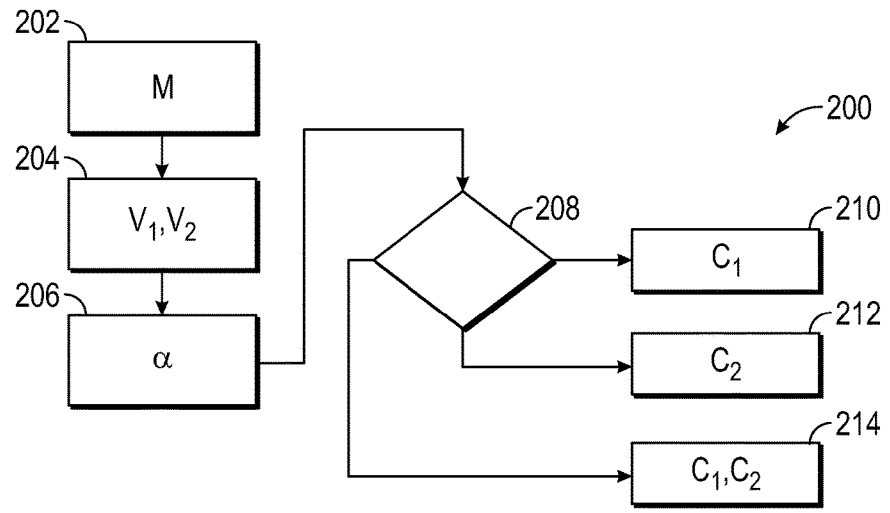
FIG. 4 is a flowchart of a method stored on and executable by the controller of FIGS. 1 and 2.

Referring now to FIG. 4, a flowchart of the method 200 stored on and executable by the controller 50 of FIGS. 1-2 is shown. Method 200 need not be applied in the specific order recited herein. Furthermore, it is to be understood that some steps may be eliminated. While the steps below are described with respect to the first and second users 20, 22, they may be repeated for any additional users.

Referring to FIGS. 3-4, method 200 may begin with block 202, where the controller 50 is programmed to sweep over a plurality of viewing positions to generate a compensation-over-viewing-angle map (denoted as "M" in FIG. 4). The compensation-over-viewing-angle map includes respective compensation factors (C) for each of the pixels 17 of the image 16 of FIG. 1 (or pixels 119 or pixels 121 in FIG. 3) for a plurality of viewing positions. The compensation-over-viewing-angle map may be stored in a look-up table or any other type of data repository known to those skilled in the art. The compensation factor (C) for each pixel may be a gray scale shift or a voltage shift, as described below.

Method 200 is a compensation process to correct the image for appearance differences caused by off-axis viewing. The human perception of brightness is a non-linear response to a linear change in luminance. The method 200 optimizes display gray scale performance for all viewing angles dynamically, increasing readability, aesthetic and user satisfaction. The image 16 (or images 123, 125) may be characterized by gray scale levels and the respective compensation factors may adjust respective luminance steps of the gray scale levels for each pixel 17 in the image 16 in real-time. The calibration parameter that controls the luminance steps of the gray levels, referred to herein as the compensation factor (C), is dynamically adjusted to optimize the viewing performance at an instantaneous viewing angle.

In block 204 of FIG. 4, the controller 50 is programmed or configured to obtain the first instantaneous viewing position ($V_1$) of the first user 20 and/or the second instantaneous viewing position ($V_2$) of the second user 22. Each instantaneous viewing position ($V_1$, $V_2$) may be based on the reference vector 30 (R), the first angle 32 (θ) and the second angle 34 (φ), shown in FIG. 1 and described above. The camera 28 of FIGS. 1-2 may be employed to obtain the instantaneous viewing positions. Any other suitable method known to those skilled in the art may be employed.

In block 206 of FIG. 4, the controller 50 is programmed to determine if the display console 14 (of the first embodiment, shown in FIG. 1) or display console 114 (of the second embodiment, shown in FIGS. 2-3) is rotated by a tilt angle (α), as shown in FIG. 5 and described above. If the tilt angle (α) (see FIG. 5) is non-zero, the controller 50 is programmed to obtain a modified first angle ($θ_2$) (see FIG. 5) and a modified second angle ($φ_2$) (see FIG. 5) to compensate for the non-zero tilt angle (α). The original position 46 is characterized by an original first angle ($θ_1$), an original second angle ($φ_1$) and an original projection ($r_{xy,1}$). The modified first angle ($θ_2$) is based at least partially on a modified projection ($r_{xy,2}$) and a radial distance (r) between the origin (O) and the first (or second) eye reference point 22. The modified second angle ($φ_2$) is based at least partially on a modified projection ($r_{xy,2}$) and a modified y coordinate ($y_2$). The modified y-coordinate ($y_2$) is a function of the original position ($x_1$, $y_1$) and the tilt angle (α), such that $y_2=(y_1 * \cosine (α))$. In the embodiment shown, the x-coordinate remains the same such that $x_1=x_2$. The modified projection ($r_{xy,2}$) is a function of the original position ($x_1$, $y_1$) and the tilt angle (α), such that $r_{xy,2}=(x_1+y_2)^{0.5}$. The modified first angle ($θ_2$) and modified second angle ($φ_2$) may be defined as:

$$θ_2=[90-(\cosine^{-1}(r_{xy,2}/r))].$$

$$φ_2=[180-(\sine^{-1}(y_2/(r_{xy,2})))].$$

In block 208 of FIG. 4, the controller 50 is programmed to determine if the compensation factors (C) are to be applied based on the first user 20 only (block 210), on the second user 22 only (block 212) or both the first and second users 20, 22 (block 214). The selection may be based on a control command selected by an operator of the device 12 or may be fixed. For example, the default option may be that the method 200 proceeds to block 210.

In block 210 of FIG. 4, the controller 50 is programmed to select and apply a first compensation factor ($C_1$) from the compensation-over-viewing-angle map based on the first instantaneous viewing position ($V_1$) of the first user 20 alone. In block 212 of FIG. 4, the controller 50 is programmed to select and apply a second compensation factor ($C_2$) from the compensation-over-viewing-angle map based on the second instantaneous viewing position ($V_2$) of the second user 22 alone.

In block 214 of FIG. 4, the controller 50 is programmed to simultaneously apply a first compensation factor ($C_1$) and a second compensation factor ($C_2$), at the same time m, to the first and second images 123, 125, respectively, based at least partially on the compensation-over-viewing-angle map. The first compensation factor ($C_1$) is applied to the first set of pixels 119 of the first image 123 for the first instantaneous viewing position of the first user 20 at the time m. The second compensation factor ($C_2$) is applied to the second set of pixels 121 of the second image 125 for the second instantaneous viewing position of the second user 22 at the time m.

Figure 6:
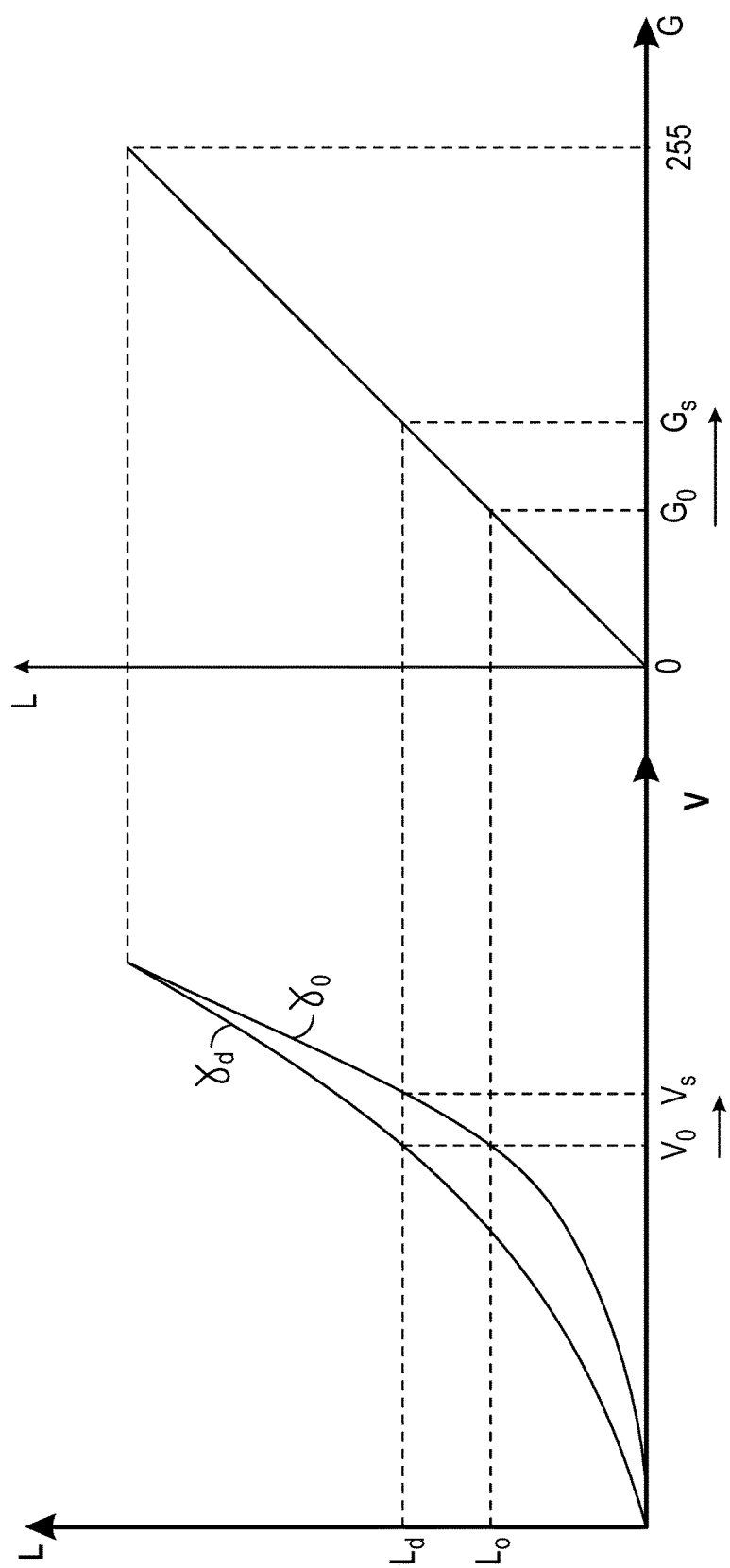
FIG. 6 is a graph with luminance (L) on the vertical axis, and voltage (V) and gray scale (G) on the horizontal axis.

As noted above, the compensation factor (C) for each pixel (in the image 16 of the first embodiment or images 123 and 125 of the second embodiment) may be a gray scale shift ($G_s$) or a voltage shift ($V_s$). FIG. 6 is a graph with luminance (L) on the vertical axis, and voltage (V) and gray scale (G) on the horizontal axis. While the gray scale (G) in FIG. 6 is shown to be from 0 to 255, it is to be appreciated that this is a non-limiting example and any scale may be employed. Referring to FIG. 6, each of the plurality of pixels may be characterized by a respective original gamma factor ($γ_o$) and a respective voltage ($V_o$). The controller 50 may be programmed to employ a predefined desired gamma constant ($γ_d$) to determine a respective desired luminance ($L_d$) at the respective original voltage ($V_o$), for each of the plurality of pixels. A respective shifted voltage ($V_s$) is determined that results in the respective desired luminance ($L_d$) at the original gamma factor ($γ_o$), for each of the plurality of pixels. The compensation may include changing the respective voltage applied to each of the plurality of pixels from the original voltage ($V_o$) to the shifted voltage ($V_s$).

Referring to FIG. 6, each of the plurality of pixels may be characterized by a respective original gamma factor ($γ_o$) and a respective original gray scale value ($G_o$). The controller 50 may be programmed to employ a predefined desired gamma constant ($γ_d$) to determine a respective desired luminance ($L_d$) at the respective original gray scale value ($G_o$), for each of the plurality of pixels. A respective shifted gray scale value ($G_s$) is determined that results in the desired luminance ($L_d$) at the respective original gamma factor ($γ_o$), for each of the plurality of pixels. The compensation may include changing the respective original gray scale value ($G_o$) for each of the plurality of pixels to the respective shifted gray scale value ($G_s$).

The controller 50 (and execution of the method 200) improves the functioning of the device 12 by improving the readability and esthetic of an image observed at an off-axis angle, thereby improving accuracy of user interaction with the device 12. For example, the first user 20 may rely on the readability of the information displayed to make control decisions for the device 12, e.g. changing the trajectory of the device 12.

The controller 50 of FIG. 1 may be an integral portion of, or a separate module operatively connected to, other controller of the device 12. The controller 50 includes a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A display assembly comprising:
a display console displaying at least one image on an image plane, the at least one image divided into a plurality of pixels;
a controller operatively connected to the display console, the controller including a processor and tangible, non-transitory memory on which is recorded instructions for executing a method for dynamically adjusting the at least one image in real-time for off-axis viewing;
wherein the display console is configured to be rotated a tilt angle ($\alpha$) about a rotation axis such that an original position ($x_1$, $y_1$) on the at least one image is rotated to a modified position ($x_2$, $y_2$) relative to an origin, a y-coordinate ($y_2$) of the modified position ($x_2$, $y_2$) being a function of the original position ($x_1$, $y_1$) and the tilt angle ($\alpha$), such that $y_2=(y_1*\text{cosine}(\alpha))$;
wherein execution of the instructions by the processor causes the controller to:
generate a compensation-over-viewing-angle map, the compensation-over-viewing-angle map including respective compensation factors for each of the plurality of pixels for multiple viewing positions;
obtain a first instantaneous viewing position of a first user at a time j and apply the respective compensation factor from the compensation-over-viewing-angle map to each of the plurality of pixels at the time j, for the first instantaneous viewing position; and
obtain a modified first angle ($\theta_2$) and a modified second angle ($\varphi_2$) to compensate for the tilt angle ($\alpha$);
wherein the modified first angle ($\theta_2$) is based at least partially on a modified projection ($r_{xy,2}$) and a radial distance (r) between the origin and a first eye reference point of the first user, the modified first angle ($\theta_2$) being defined as $[90-(\text{cosine}^{-1}(r_{xy,2}/r))]$;
wherein the modified second angle ($\varphi_2$) is based at least partially on the modified projection ($r_{xy,2}$) and a modified y coordinate ($y_2$), the modified second angle ($\varphi_2$) being defined as $[180-(\text{sine}^{-1}(y_2/(r_{xy,2})))]$; and
wherein the modified projection ($r_{xy,2}$) is a function of the original position ($x_1$, $y_1$) and the tilt angle ($\alpha$), such that $r_{xy,2}=(x_2+y_2)^{0.5}$.

2. The assembly of claim 1, wherein the controller is programmed to:
obtain a second instantaneous viewing position of a second user at a time k; and
apply the respective compensation factor from the compensation-over-viewing-angle map to each of the plurality of pixels at the time k, for the second instantaneous viewing position.

3. The assembly of claim 1:
wherein the image plane defines a coordinate system with the origin, an x-axis, a y-axis and a z-axis, the x-axis and the y-axis defining an x-y plane;
wherein the first instantaneous viewing position is based at least partially on a viewing reference vector (R) between the origin and the first eye reference point of the first user, a first angle ($\theta$) and a second angle ($\varphi$);
wherein the first angle ($\theta$) is between the x-axis and an x-y projection vector ($r_{xy}$), the x-y projection vector ($r_{xy}$) being a projection of the viewing reference vector (R) on the x-y plane; and
wherein the second angle ($\varphi$) is between a normal vector perpendicular to the display console and the viewing reference vector (R).

4. The assembly of claim 3, further comprising:
a camera operatively connected to the controller and configured to obtain the eye reference point of the first user in real-time;
wherein the viewing reference vector (R), the first angle ($\theta$) and the second angle ($\varphi$) are dynamically adjusted based at least partially on the first eye reference point in real-time.

5. The assembly of claim 1:
wherein the display console includes a first set of pixels configured to support presentation of a first image visible from a first side of the display console;
wherein the display console includes a second set of pixels configured to support presentation of a second image visible from a second side of the display console; and further comprising:
  a barrier structure positioned adjacent to the display console, the barrier structure separating the first and second images such the first image is not visible from the second side and the second image is not visible from the first side.

6. The assembly of claim 5:
wherein the at least one user includes a first user positioned at the first side of the display console and a second user positioned at the second side of the display console;
wherein the controller is programmed to:
  obtain first and second instantaneous viewing positions of the first and second users, respectively;
  apply a first and a second compensation factor simultaneously, at a time m, to the first and second images, respectively, based at least partially on the compensation-over-viewing-angle map; and
wherein the first compensation factor is applied to the first set of pixels of the first image for the first instantaneous viewing position of the first user at the time m and second compensation factor is applied to the second set of pixels of the second image for the second instantaneous viewing position of the second user at the time m.

7. The assembly of claim 1, wherein the at least one image is characterized by gray scale levels and the respective compensation factors adjust respective luminance steps of the gray scale levels in real-time.

8. The assembly of claim 1, wherein each of the plurality of pixels is characterized by a respective original gamma factor ($\gamma_o$) and a respective voltage ($V_o$), and wherein the controller is programmed to:
  employ a predefined desired gamma constant ($\gamma_d$) to determine a respective desired luminance ($L_d$) at the respective original voltage ($V_o$), for each of the plurality of pixels;
  determine a respective shifted voltage ($V_s$) that results in the respective desired luminance ($L_d$) at the original gamma factor ($\gamma_o$), for each of the plurality of pixels; and
  change a respective voltage applied to each of the plurality of pixels from the original voltage ($V_o$) to the shifted voltage ($V_s$).

9. The assembly of claim 1, wherein each of the plurality of pixels is characterized by a respective original gamma factor ($\gamma_o$) and a respective original gray scale value ($G_o$), and wherein the controller is programmed to:
  employ a predefined desired gamma constant ($\gamma_d$) to determine a respective desired luminance ($L_d$) at the respective original gray scale value ($G_o$), for each of the plurality of pixels;
  determine a respective shifted gray scale value ($G_s$) that results in the desired luminance ($L_d$) at the respective original gamma factor ($\gamma_o$), for each of the plurality of pixels; and
  change the respective original gray scale value ($G_o$) for each of the plurality of pixels to the respective shifted gray scale value ($G_s$).

10. A method for dynamically adjusting at least one image in real-time for off-axis viewing in a display assembly having a controller, a display console displaying the at least one image on an image plane, the at least one image being divided into a plurality of pixels, the method comprising:
  generating a compensation-over-viewing-angle map having respective compensation factors for each of the plurality of pixels for multiple viewing positions, via the controller;
  obtaining a first instantaneous viewing position of a first user at a time j, via a camera;
  applying the respective compensation factor from the compensation-over-viewing-angle map to each of the plurality of pixels at the time j, for the first instantaneous viewing position via the controller;
  controlling the at least one image based on the respective compensation factor from the compensation-over-viewing-angle map;
  wherein the display console is configured to be rotated a tilt angle ($\alpha$) about a rotation axis such that an original position ($x_1$, $y_1$) on the image is rotated to a modified position ($x_2$, $y_2$) relative to the origin, a y-coordinate ($y_2$) of the modified position ($x_2$, $y_2$) being a function of the original position ($x_1$, $y_1$) and the tilt angle ($\alpha$), such that $y_2 = (y_1 * \cosine(\alpha))$; the method further including:
  obtaining a modified first angle ($\theta_2$) and a modified second angle ($\varphi_2$) to compensate for the tilt angle ($\alpha$);
  wherein the modified first angle ($\theta_2$) is based at least partially on a modified projection ($r_{xy,2}$) and a radial distance (r) between the origin and a first eye reference point of the first user, the modified first angle ($\theta_2$) being defined as $[90-(\cosine^{-1}(r_{xy,2}/r))]$;
  wherein the modified second angle ($\varphi_2$) is based at least partially on a modified projection ($r_{xy,2}$) and a modified y coordinate ($y_2$), the modified second angle ($\varphi_2$) being defined as $[180-(\sine^{-1}(y_2/(r_{xy,2})))]$; and
  wherein the modified projection ($r_{xy,2}$) is a function of the original position ($x_1$, $y_1$) and the tilt angle ($\alpha$), such that $r_{xy,2} = (x_2+y_2)^{0.5}$.

11. The method of claim 10, further comprising:
  obtaining a second instantaneous viewing position of a second user at a time k, via the camera; and
  applying the respective compensation factor from the compensation-over-viewing-angle map to each of the plurality of pixels at the time k, for the second instantaneous viewing position, via the controller.

12. The method of claim 10, wherein:
  the display assembly further includes a barrier structure positioned adjacent to the display console;
  the display console includes a first set of pixels configured to support presentation of a first image visible from a first side of the display console;
  the display console includes a second set of pixels configured to support presentation of a second image visible from a second side of the display console; and
  the barrier structure separates the first and second images such the first image is not visible from the second side and the second image is not visible from the first side.

13. The method of claim 12, further comprising:
  obtaining the first instantaneous viewing position of the first user positioned at the first side of the display console at a time m, via the camera;
  obtaining a second instantaneous viewing position of a second user positioned at the second side of the display console at the time m, via the camera;

applying a first and a second compensation factor simultaneously, at a time m, to the first and second images, respectively, based at least partially on the compensation-over-viewing-angle map, via the controller; and wherein the first compensation factor is applied to the first set of pixels of the first image for the first instantaneous viewing position of the first user at the time m and second compensation factor is applied to the second set of pixels of the second image for the second instantaneous viewing position of the second user at the time m.

14. The method of claim 10, wherein each of the plurality of pixels is characterized by a respective original gamma factor ($\gamma_o$) and a respective original gray scale value ($G_o$), and further comprising:

employing a predefined desired gamma constant ($\gamma_d$) to determine a respective desired luminance ($L_d$) at the respective original voltage ($V_o$), for each of the plurality of pixels, via the controller;

determining a respective shifted voltage ($V_s$) that results in the respective desired luminance ($L_d$) at the original gamma factor ($\gamma_o$), for each of the plurality of pixels, via the controller; and changing a respective voltage applied to each of the plurality of pixels from the original voltage ($V_o$) to the shifted voltage ($V_s$), via the controller.

15. The method of claim 10, wherein each of the plurality of pixels is characterized by a respective original gamma factor ($\gamma_o$) and a respective original gray scale value ($G_o$), and further comprising:

employing a predefined desired gamma constant ($\gamma_d$) to determine a respective desired luminance ($L_d$) at the respective original gray scale value ($G_o$), for each of the plurality of pixels, via the controller;

determining a respective shifted gray scale value ($G_s$) that results in the desired luminance ($L_d$) at the respective original gamma factor ($\gamma_o$), for each of the plurality of pixels, via the controller; and changing the respective original gray scale value ($G_o$) for each of the plurality of pixels to the respective shifted gray scale value ($G_s$), via the controller.

\* \* \* \* \*